(12) United States Patent
Nickolaou et al.

(10) Patent No.: US 8,798,887 B2
(45) Date of Patent: Aug. 5, 2014

(54) SYSTEM AND METHOD FOR ESTIMATING THE MASS OF A VEHICLE

(75) Inventors: James N. Nickolaou, Clarkston, MI (US); Leonard J. Leshinsky, Jr., Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 28 days.

(21) Appl. No.: 13/307,460

(22) Filed: Nov. 30, 2011

(65) Prior Publication Data

US 2013/0138288 A1   May 30, 2013

(51) Int. Cl.
  *G01G 19/03*   (2006.01)
  *B60W 40/12*   (2012.01)

(52) U.S. Cl.
  USPC ............... 701/70; 701/124; 702/175; 73/865

(58) Field of Classification Search
  USPC ............. 701/23, 70, 33.4, 110, 124; 702/173, 702/175; 73/865
  See application file for complete search history.

(56) References Cited

U.S. PATENT DOCUMENTS

| | | | |
|---|---|---|---|
| 5,435,729 A * | 7/1995 | Hildreth et al. | 434/365 |
| 5,669,847 A * | 9/1997 | Kashiwabara | 477/46 |
| 5,752,752 A * | 5/1998 | Tozu et al. | 303/146 |
| 6,173,226 B1 * | 1/2001 | Yoshida et al. | 701/51 |
| 6,226,587 B1 * | 5/2001 | Tachihata et al. | 701/72 |
| 6,304,806 B1 * | 10/2001 | Colby et al. | 701/70 |
| 6,339,749 B1 * | 1/2002 | Rieker et al. | 702/173 |
| 6,347,269 B1 * | 2/2002 | Hayakawa et al. | 701/51 |
| 6,438,510 B2 * | 8/2002 | Zhu et al. | 702/175 |
| 6,446,024 B1 * | 9/2002 | Leimbach et al. | 702/141 |
| 6,498,976 B1 * | 12/2002 | Ehlbeck et al. | 701/70 |
| 7,818,140 B2 * | 10/2010 | Dreier et al. | 702/173 |
| 2003/0040861 A1 * | 2/2003 | Bellinger et al. | 701/51 |
| 2004/0006421 A1 * | 1/2004 | Yanase | 701/124 |
| 2004/0167705 A1 * | 8/2004 | Lingman et al. | 701/124 |
| 2005/0010356 A1 * | 1/2005 | Ishiguro et al. | 701/124 |
| 2005/0065695 A1 * | 3/2005 | Grieser | 701/70 |
| 2005/0272560 A1 * | 12/2005 | Doering et al. | 477/186 |
| 2006/0149424 A1 * | 7/2006 | Hecker et al. | 701/1 |
| 2006/0178797 A1 * | 8/2006 | Larsen et al. | 701/54 |
| 2006/0293815 A1 * | 12/2006 | McCann | 701/37 |
| 2007/0038357 A1 * | 2/2007 | Leminoux et al. | 701/75 |
| 2008/0126009 A1 * | 5/2008 | Huh et al. | 702/175 |
| 2008/0186204 A1 * | 8/2008 | Buckley | 340/901 |
| 2009/0018732 A1 * | 1/2009 | Choby et al. | 701/51 |
| 2009/0125170 A1 * | 5/2009 | Noffsinger et al. | 701/20 |
| 2009/0192760 A1 * | 7/2009 | Dreier et al. | 702/173 |

(Continued)

*Primary Examiner* — Calvin Cheung
*Assistant Examiner* — Courtney Heinle
(74) *Attorney, Agent, or Firm* — Lionel D. Anderson; Reising Ethington P.C.

(57) ABSTRACT

A vehicle system and method that estimates or approximates the mass of a vehicle so that a more accurate vehicle mass estimate can be made available to other vehicle systems, such as an adaptive cruise control (ACC) system or an automated lane change (LCX) system. In an exemplary embodiment, the method compares an actual acceleration of the vehicle to an expected acceleration while the vehicle is under the control of an automated acceleration event. The difference between these two acceleration values, along with other potential input, may then be used to approximate the actual mass of the vehicle in a way that takes into account items such as passengers, cargo, fuel, etc. Once an accurate vehicle mass estimate is generated, the method may make this estimate available to other vehicle components, devices, modules, systems, etc. so that their performance can be improved.

18 Claims, 2 Drawing Sheets

(56) References Cited

U.S. PATENT DOCUMENTS

| | | | |
|---|---|---|---|
| 2010/0121549 A1* | 5/2010 | Fukuda et al. | 701/93 |
| 2010/0235039 A1* | 9/2010 | Kajigai et al. | 701/29 |
| 2011/0015808 A1* | 1/2011 | Dreier et al. | 701/2 |
| 2011/0066322 A1* | 3/2011 | Karlsson et al. | 701/35 |
| 2012/0022760 A1* | 1/2012 | Kato et al. | 701/70 |
| 2012/0290187 A1* | 11/2012 | Oesterreicher et al. | 701/99 |
| 2013/0138318 A1* | 5/2013 | Choby | 701/84 |

\* cited by examiner

SYSTEM AND METHOD FOR ESTIMATING THE MASS OF A VEHICLE

FIELD

The present invention generally relates to vehicle systems and methods and, more particularly, to systems and methods that utilize a vehicle mass estimate or value.

BACKGROUND

Vehicle systems utilize a wide variety of input during operation, some of which is known and some of which is approximated. For example, the tare weight (the unladen weight of a vehicle), the curb weight (the weight of the vehicle with all necessary consumables like motor oil, coolant, a full tank of fuel, etc., but without passengers and cargo) and the gross vehicle weight rating (the maximum allowable total mass of the vehicle) are typically known quantities that can be obtained from the vehicle manufacturer or some other source. Other input, like the actual mass of the vehicle including all of its contents like fuel, passengers, cargo, etc. may not be known with precision, as that quantity changes over time.

SUMMARY

According to one embodiment, there is provided a method for estimating a vehicle mass. The method may comprise the steps of: (a) determining an expected acceleration of the vehicle; (b) determining an actual acceleration of the vehicle; (c) comparing the expected acceleration to the actual acceleration; and (d) using the comparison of the expected acceleration to the actual acceleration to determine a vehicle mass estimate.

According to another embodiment, there is provided a method for estimating a vehicle mass. The method may comprise the steps of: (a) determining if the vehicle is under the control of an autonomous acceleration event; (b) evaluating the velocity and/or acceleration of the vehicle while the vehicle is under the control of the autonomous acceleration event, wherein the velocity and/or acceleration of the vehicle is evaluated in a closed-loop manner; (c) using the results of the closed-loop evaluation to generate a vehicle mass estimate; and (d) providing the vehicle mass estimate to a vehicle module so that the vehicle module can generate one or more command signals.

DRAWINGS

Figure 1:
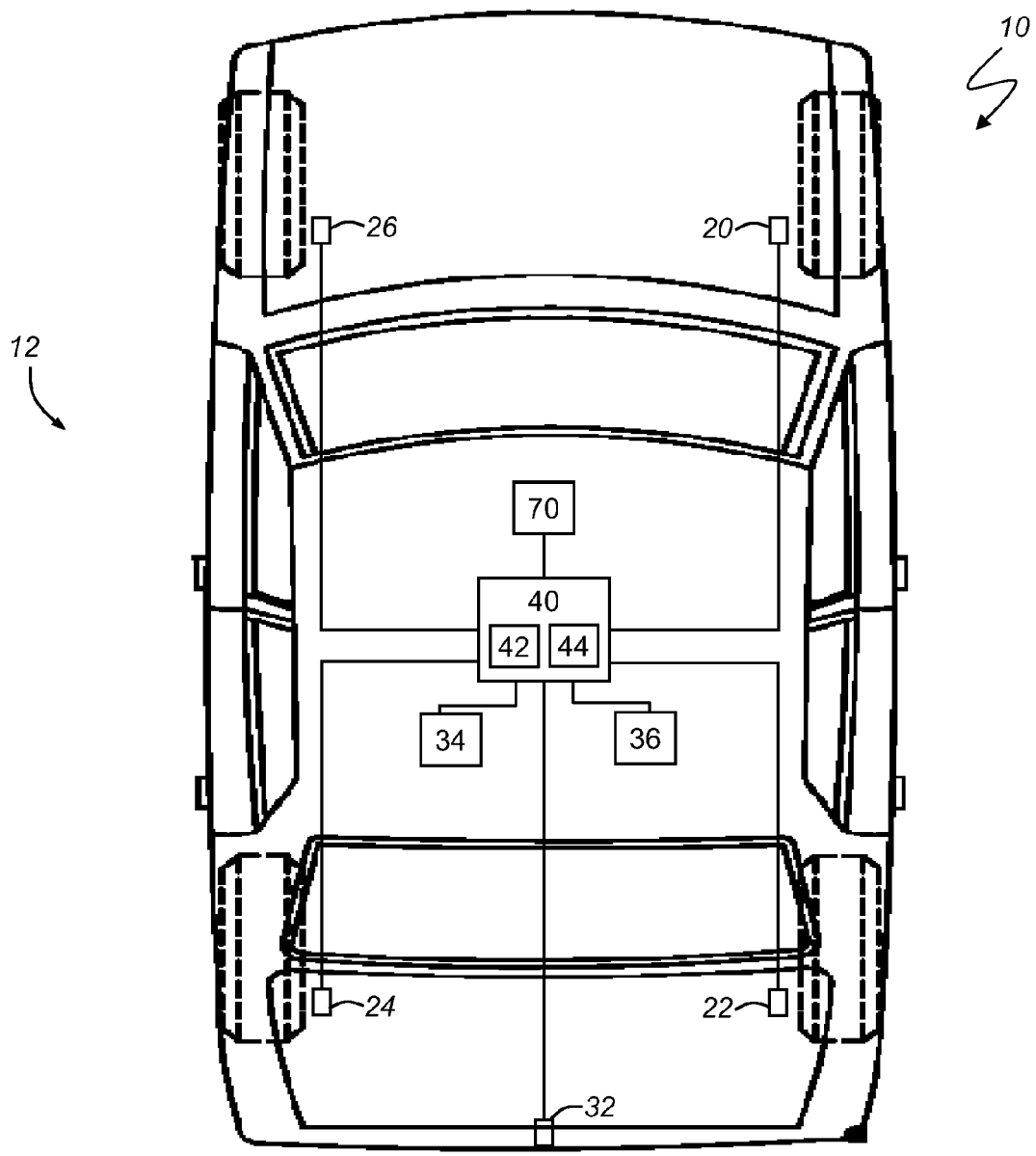
Figure 2:
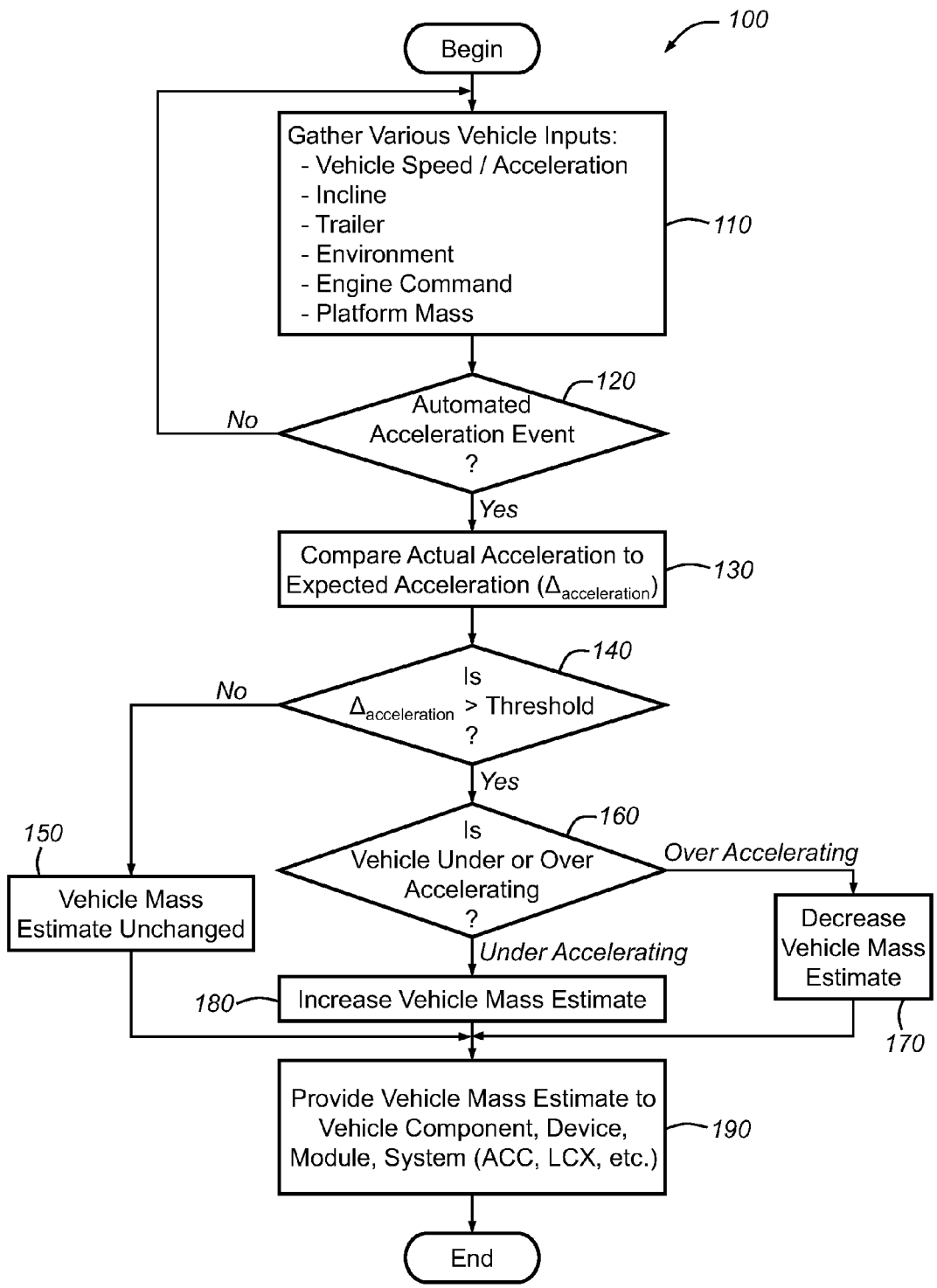

Preferred exemplary embodiments will hereinafter be described in conjunction with the appended drawings, wherein like designations denote like elements, and wherein:

FIG. 1 is a schematic view of a vehicle having an exemplary vehicle system; and FIG. 2 is a flowchart illustrating an exemplary method for estimating the mass of a vehicle and may be used with a vehicle system, such as the one shown in FIG. 1.

DESCRIPTION

The vehicle system and method described herein may be used to estimate or approximate the mass of a vehicle so that a more accurate vehicle mass estimate can be generated and made available to other vehicle systems, such as an adaptive cruise control (ACC) system or an automated lane change (LCX) system. In an exemplary embodiment, the present method compares an actual acceleration of the vehicle to an expected acceleration while the vehicle is under the control of an automated acceleration event. The difference between these two acceleration values, along with other potential input, may then be used to approximate the actual mass of the vehicle in a way that takes into account items such as passengers, cargo, fuel, etc. Once an accurate vehicle mass estimate is generated, the method may make this estimate available to other vehicle components, devices, modules, systems, etc. so that their performance can be improved.

With reference to FIG. 1, there is shown a general and schematic view of an exemplary vehicle system 10 installed on a vehicle 12, where the vehicle system may estimate or approximate the mass of vehicle 12. It should be appreciated that the present system and method may be used with any type of vehicle, including traditional vehicles, hybrid electric vehicles (HEVs), extended-range electric vehicles (EREVs), battery electrical vehicles (BEVs), passenger vehicles, sports utility vehicles (SUVs), cross-over vehicles, trucks, vans, buses, recreational vehicles (RVs), etc. These are merely some of the possible applications, as the system and method described herein are not limited to the exemplary embodiments shown in FIGS. 1-2 and could be implemented in any number of different ways. According to one example, vehicle system 10 includes speed sensors 20-26, trailer sensor 32, environmental sensor 34, incline sensor 36, and control module 40, and the vehicle system may provide a vehicle mass estimate to some other component, device, module and/or system 70.

Any number of different sensors, components, devices, modules, systems, etc. may provide vehicle system 10 with information or input that can be used by the present method. These include, for example, the exemplary sensors shown in FIG. 1, as well as other sensors that are known in the art but are not shown here. It should be appreciated that speed sensors 20-26, trailer sensor 32, environmental sensor 34, incline sensor 36, as well as any other sensor located in and/or used by vehicle system 10 may be embodied in hardware, software, firmware or some combination thereof. These sensors may directly sense or measure the conditions for which they are provided, or they may indirectly evaluate such conditions based on information provided by other sensors, components, devices, modules, systems, etc. Furthermore, these sensors may be directly coupled to control module 40, indirectly coupled via other electronic devices, a vehicle communications bus, network, etc., or coupled according to some other arrangement known in the art. These sensors may be integrated within another vehicle component, device, module, system, etc. (e.g., sensors that are already a part of an engine control module (ECM), traction control system (TCS), electronic stability control (ESC) system, antilock brake system (ABS), etc.), they may be stand-alone components (as schematically shown in FIG. 1), or they may be provided according to some other arrangement. It is possible for any of the various sensor readings described below to be provided by some other component, device, module, system, etc. in vehicle 12 instead of being provided by an actual sensor element. In some instances, multiple sensors might be employed to sense a single parameter (e.g., for providing redundancy). It should be appreciated that the foregoing scenarios represent only some of the possibilities, as vehicle system 10 is not limited to any particular sensor or sensor arrangement.

Speed sensors 20-26 provide vehicle system 10 with readings or other information that may be helpful when estimating the mass of vehicle 12. In one embodiment, speed sensors 20-26 generate speed readings that are representative of vehicle speed and/or acceleration readings that are representative of vehicle acceleration, and the speed sensors are coupled to control module 40. Speed sensors 20-26 may utilize a variety of different sensor types and techniques, including those that use rotational wheel speed, ground speed, accelerator pedal position, gear shifter selection, accelerometers, engine speed, engine output, and throttle valve position, to name a few. In the example shown in FIG. 1, individual wheel speed sensors 20-26 are coupled to each of the host vehicle's four wheels and separately report the rotational velocity of the four wheels. Skilled artisans will appreciate that these sensors may operate according to optical, electromagnetic or other technologies, and that other parameters may be derived or calculated from the velocity readings, such as vehicle acceleration. In another embodiment, speed sensors 20-26 determine vehicle speed relative to the ground by directing radar, laser and/or other signals towards the ground or stationary objects and analyzing the reflected signals, or by employing feedback from an optional Global Positioning System (GPS). As mentioned above, speed sensors 20-26 may be part of some other device, module, system, etc., like an engine control module (ECM) or an anti-lock braking system (ABS).

Trailer sensor 32 provides vehicle system 10 with readings or other information that may be used to detect and/or evaluate a trailer being towed by vehicle 12. In one embodiment, trailer sensor 32 is coupled to control module 40 and generates trailer readings that indicate the presence of a trailer connected to vehicle 12 when a trailer plug is connected to the vehicle's towing socket. Trailer sensor 32 may be a single sensor (e.g., part of a vehicle's towing socket) or it may include other devices such as a light detection and ranging (LIDAR) device, radio detection and ranging (RADAR) device, vision device (e.g., backup camera), a vehicle-to-vehicle communication device, or a combination thereof. According to an exemplary embodiment, sensor 32 includes a rearward-looking short-range RADAR device and/or a camera that are part of an existing vehicle backup system and are mounted on the back of the vehicle, such as at the back bumper. These devices may monitor an area behind vehicle 12 and inform vehicle system 10 of the presence of a trailer as well as certain attributes of the trailer (e.g., its approximate size, weight, number of wheels, whether it is empty or hauling cargo, etc.). Other trailer sensor embodiments and arrangements are possible as well.

Environmental sensor 34 provides vehicle system 10 with readings or other information that may be used to detect or evaluate current environmental conditions that can impact the acceleration or performance of vehicle 12. For example, environmental sensor 34 may include an outside temperature sensor, an outside humidity sensor, a precipitation sensor, or any other type of sensing component that senses or gathers environmental readings and provides them to control module 40. Some examples of how environmental sensor 34 may determine environmental conditions include directly sensing and measuring environmental readings, indirectly determining environmental readings by gathering them from other modules or systems in the vehicle, obtaining the readings from a vehicle-to-vehicle communications device, or by receiving wireless transmissions that include weather reports, forecasts, etc. from a weather-related service or website. In the last example, the wireless transmissions may be received at a telematics unit which then conveys the pertinent environmental data to control module 40. Other examples of environmental sensors are possible as well.

Incline sensor 36 provides readings or other information to vehicle system 10 that can be indicative of the incline, slope or orientation of vehicle 12. For example, incline sensor 36 may be part of a vehicle dynamics sensor unit that measures parameters such as incline, as well as yaw rate, longitudinal acceleration, etc. and provides incline readings to control module 40. There are a variety of different types of incline sensors that may be employed, as incline sensor 36 is not limited to any particular type, including those that are affected by static acceleration due to gravity and provide information regarding the angle at which the vehicle is tilted, with respect to the Earth, as well as those that use RADAR, LIDAR, laser, and/or cameras. It is also possible to use an inclinometer, which is an instrument that measures angles of slope and inclination with respect to gravity by creating an artificial horizon; other names include a tilt sensor, tilt indicator, slope meter, slope gauge, gradient meter, etc. Such a device is sometimes used by vehicle anti-theft systems to guard against illegal towing. In addition, any combination of navigation components, devices, module, etc., like a telematics unit or a GPS unit may use the current position of the vehicle and road- or map-data to evaluate the incline of the road.

As previously stated, vehicle system 10 is not limited to any particular type of sensor or sensor arrangement, any specific technique for gathering or processing sensor readings, or any particular method for providing sensor readings, as the embodiments described herein are simply meant to be exemplary. Other sensors or sensor combinations may be used to provide information to vehicle system 10. For instance, in one embodiment, seat occupant sensors that provide occupant weight related information may be employed by vehicle system 10. In another embodiment, a fuel level sensor (e.g., float sensor, RF sensor, ultrasonic sensor, etc.) located inside or outside of a fuel tank of vehicle 12 can be used to provide fuel level readings directly or indirectly (e.g., via a fuel system control module, fuel gauge, etc.).

Control module 40 may include any variety of electronic processing devices, memory devices, input/output (I/O) devices, and/or other known components, and may perform various control and/or communication related functions. In an exemplary embodiment, control module 40 includes an electronic memory device 42 that stores various sensor readings (e.g., sensor readings from sensors 20-26 and 32-36), look up tables or other data structures, algorithms (e.g., the algorithm embodied in the exemplary method described below), etc. Memory device 42 may also store pertinent characteristics and background information pertaining to vehicle 12, such as information relating to acceleration limits, torque limits, vehicle mass, various known vehicle weights (e.g., unladen weight, curb weight, gross vehicle weight rating, etc.). Control module 40 may also include an electronic processing device 44 (e.g., a microprocessor, a microcontroller, an application specific integrated circuit (ASIC), etc.) that executes instructions for software, firmware, programs, algorithms, scripts, etc. that are stored in memory device 42 and may govern the processes and methods described herein. Control module 40 may be electronically connected to sensors 20-26 and 32-36, as well as other vehicle components, devices, modules and systems via suitable vehicle communications and can interact with them when required. These are, of course, only some of the possible arrangements, functions and capabilities of control module 40, as other embodiments could also be used.

Module 70 represents any vehicle component, device, module, system, etc. that requires a vehicle mass estimate for performance of its operation. To illustrate, module 70 could be an adaptive cruise control (ACC) system, an automated lane change (LCX) system, or some other active vehicle system that uses a vehicle mass value when performing some calculation or other operation. In the example of an adaptive cruise control (ACC) system, control module 40 may provide the ACC system 70 with a vehicle mass estimate which the system then uses to execute some algorithm; deviations or inaccuracies in the vehicle mass estimate may impact the outcome of that algorithm, as ACC system 70 may mistakenly believe that the vehicle is heavier or lighter than it actually is. Depending on the particular embodiment, module 70 may be an input/output device that can both receive information from and provide information to control module 40, and it can be a stand-alone vehicle electronic module or it can be part of a larger network or system (e.g., a traction control system (TCS), electronic stability control (ESC) system, antilock brake system (ABS), driver assistance system, adaptive cruise control (ACC) system, lane departure warning system, etc.), to name a few possibilities. It is even possible for module 70 to be combined or integrated with control module 40, as module 70 is not limited to any one particular embodiment or arrangement.

Again, the preceding description of exemplary vehicle system 10 and the drawing in FIG. 1 are only intended to illustrate one potential embodiment and the following method is not confined to use with only that system. Any number of other system arrangements, combinations and architectures, including those that differ significantly from the one shown in FIG. 1, may be used instead.

Turning now to FIG. 2, there is shown an exemplary method 100 that may be used with vehicle system 10 in order to estimate the mass of vehicle 12 and to make that estimate available to other vehicle systems and methods. An accurate vehicle mass estimate can be desirable, especially when the estimate is used to generate command signals like those provided by module 70 to automatically control engine torque or some other vehicle operating parameter. If the vehicle mass estimate is off by 25%, for example, then the corresponding command signals can be off by a similar amount. According to an exemplary embodiment, method 100 uses input from existing sensors around the vehicle to generate a vehicle mass estimate in a closed-loop, self-learning manner.

Beginning with step 110, the method gathers various vehicle inputs and other information and performs other tasks like resetting variables, flags, etc. These vehicle inputs may include vehicle speed, vehicle acceleration, information regarding the presence and nature of a towed trailer, outside environmental conditions (e.g., road surface conditions, weather conditions, etc.), road incline or slope information, engine commands, platform vehicle mass values, and/or any other input or information that may be useful to method 100. In one embodiment, control module 40 receives speed and/or acceleration readings from sensors 20-26, trailer readings from trailer sensor 32, environmental readings from environmental sensor 34, incline readings from incline sensor 36, command signals from module 70 in the form of engine commands or the like, and a platform vehicle mass value (e.g., the tare weight or curb weight of vehicle 12) that is stored in memory device 42. Step 110 may certainly receive other combinations of inputs and information, as the preceding combination is only one example.

Next, step 120 determines if the vehicle is currently under the control of an automated acceleration event. An "automated acceleration event," as used herein, broadly includes any vehicle event or occurrence where the vehicle is automatically or independently accelerated without direct driver intervention. An example of an automated acceleration event is when an adaptive cruise control (ACC) system takes control of engine commands that accelerate the vehicle without the driver engaging the accelerator pedal. One reason why an autonomous acceleration event can create a desirable environment in which to estimate the vehicle mass, is that an autonomous acceleration event typically involves a more controlled and consistent acceleration than a manual acceleration event where the driver engages a foot pedal. The engine commands generated from manual engagement of a foot pedal inherently include more fluctuations and variance than those automatically generated by an engine control module, an adaptive cruise control (ACC) system, or the like. Moreover, an automated acceleration event where the vehicle is accelerated from stop or a low speed (e.g., a take-off event starting from less than 5 k.p.h. or less than a certain longitudinal acceleration) can be particularly useful in that it is not only a somewhat controlled environment, but also one where differences between actual and expected vehicle mass can manifest themselves in perceivable and measurable ways; that is, they can result in different accelerations that can then be measured. If step 120 determines that the vehicle is currently engaged in an automated acceleration event, then method 100 proceeds to the next step; otherwise, the method loops back for continued monitoring. Of course, step 120 may look for conditions other than automated acceleration events, as this is only one example.

At step 130, the method compares the actual acceleration of the vehicle to the expected acceleration. The "actual acceleration," as used herein, is representative of the acceleration that is actually or truly experienced by the vehicle, as it relates to some fixed frame of reference like the ground. The "expected acceleration," on the other hand, is representative of the acceleration that is expected or anticipated of the vehicle in view of certain engine commands. For instance, when a vehicle is under the control of an automated acceleration event and module 70 or some other device issues an engine command, it is expected that the vehicle will experience a certain acceleration (i.e., the expected acceleration); however, due to various factors such as the mass of the vehicle, the incline and conditions of the road surface, the presence of a trailer, etc., the actual acceleration that is experienced by the vehicle may differ from its expected counterpart. In an exemplary embodiment, step 130 uses acceleration readings from sensors 20-26 to determine an actual acceleration value (a measured value), uses engine commands from module 70 to determine an expected acceleration value (a derived or calculated value; for instance, via a look-up table or algorithm), and then subtracts the actual acceleration from the expected acceleration to arrive at the acceleration difference ($\Delta_{acceleration}$), or vice versa.

$$\Delta_{acceleration} = \text{Expected Acceleration} - \text{Actual Acceleration} \quad \text{(equation 1)}$$

Because method 100 is attempting to estimate the mass of the vehicle and is using a difference in accelerations to do so, step 130 may want to take other acceleration-influencing factors into account so that the acceleration difference ($\Delta_{acceleration}$) is largely driven by or attributable to the mass differential and not the other factors. One way to do this is to evaluate the trailer readings from trailer sensor 32 in order to determine if vehicle 12 is currently pulling a trailer and, if so, to approximate the size of the trailer. Obviously, pulling a trailer can reduce the actual acceleration of the vehicle and, if not taken into account, it can result in a rather large acceleration difference ($\Delta_{acceleration}$). Depending on the particular embodiment, step 130 may attempt to remove the effect of the towed trailer on the calculation by decreasing the expected acceleration value, or the step may determine that it is too difficult to accurately estimate vehicle mass with a trailer in tow and thus wait until there is no trailer present. In the latter case, the method may resort to using a default vehicle mass value until a non-towing situation arises.

Another potential factor that can affect acceleration pertains to environmental and/or road conditions. If, for example, the roads are wet or icy, or made of dirt, gravel, cobblestone, etc., then it may impact the actual acceleration of the vehicle and hence the calculated acceleration difference ($\Delta_{acceleration}$). This could potentially result in an incorrect conclusion that the vehicle is much heavier than it really is if the decrease in actual acceleration is due to wheel slippage and not to increased vehicle mass. Step 130 may take these factors into account by receiving speed readings from speed sensors 20-26 and/or environmental readings from environmental sensor 34. As with the towing issue described above, the method may attempt to compensate for the conditions by decreasing the expected acceleration value or it may decide that the conditions are too severe to constitute an appropriate environment for estimating vehicle mass; in such a case, the method may instead utilize a default vehicle mass until the environmental and/or road conditions no longer exist.

The incline or slope of the road is another factor that can influence the acceleration calculations performed by step 130 and, therefore, may be taken into account in a manner similar to that described above. Step 130 may use the incline readings from incline sensor 36 to try and quantify the affect that the inclined or declined road segment will have on the acceleration of the vehicle; an incline typically results in a decrease of the expected acceleration, while a decline usually results in an increase in the expected acceleration. Again, the method may decide to continue with the vehicle mass estimate by taking the road incline or decline into account, or it may determine that the slope is too severe to allow for a reasonably accurate acceleration comparison and instead opt for using a default vehicle mass value. Skilled artisans will appreciate that factors other than those discussed in the preceding paragraphs can influence or impact the acceleration comparison performed in step 130, and that such factors could certainly be considered and taken into account by the present method. Step 130 is not limited to the examples above, as they are only intended to illustrate some of the potential factors that can affect acceleration.

Step 140, which is an optional step, compares the acceleration difference ($\Delta_{acceleration}$) to a threshold. The value of the threshold may vary depending on several factors including the size of the vehicle, the engine, the expected vehicle mass, road conditions, etc., and the different threshold values may be stored in memory 42. In one sense, step 140 may provide the method with a validity assessment or some level of confidence regarding the acceleration difference ($\Delta_{acceleration}$), since a very small $\Delta_{acceleration}$ value could be due to noisy data or may not cause any noticeable reduction in vehicle performance and, therefore, may be ignored. Similarly, a very large $\Delta_{acceleration}$ value may not be reasonable for the size, weight and/or other vehicle characteristics and could be ignored as well. Different thresholds could also be used depending on whether the acceleration difference ($\Delta_{acceleration}$) is a positive or negative value. If $\Delta_{acceleration}$ is a positive value (the expected acceleration is greater than the actual one), then it may be compared to a negative threshold; if $\Delta_{acceleration}$ is a positive value (the expected value is less than the actual acceleration), then it can be compared to a positive threshold. Other embodiments, such as ones using the absolute value of $\Delta_{acceleration}$, are also possible. If the acceleration difference ($\Delta_{acceleration}$) is higher than the threshold value (e.g., 5-15% of actual acceleration), then the method proceeds to step 160 as an adjustment to the vehicle mass estimate is probably needed. Otherwise, the method proceeds to step 150 where the vehicle mass estimate is kept unchanged.

Next, step 160 determines if the vehicle is under accelerating (under delivering) or over accelerating (over delivering). A positive ($\Delta_{acceleration}$) value indicates that the actual acceleration is lower than the expected acceleration (an under accelerating situation) and that the previous vehicle mass estimate may be too low; in this case the method proceeds to step 180 so that the vehicle mass estimate can be increased. Conversely, a negative ($\Delta_{acceleration}$) value corresponds to an actual acceleration that is higher than the expected acceleration (an over accelerating situation), and suggests that the previous vehicle mass estimate may be too high. In this case, the method proceeds to step 170 so that the vehicle mass estimate can be decreased.

Those skilled in the art appreciate the relationship between quantities such as force, mass, acceleration, torque, etc., as they have been enshrined in various equations and laws of motion:

$$\text{Force} = \text{Mass} \times \text{Acceleration} \qquad \text{(equation 2)}$$

$$\text{Torque} = \text{Force} \times \text{Radius} \qquad \text{(equation 3)}$$

Equations 2 and 3 can be combined and manipulated in order to solve for mass (m) and for mass difference ($\Delta_{mass}$), as expressed below:

$$\text{Mass} = \text{Torque}/(\text{Acceleration} \times \text{Radius}) \qquad \text{(equation 4)}$$

$$\Delta_{mass} = \text{Torque}/(\Delta_{acceleration} \times \text{Radius}) \qquad \text{(equation 5)}$$

From equation 5, it can be seen that the difference in mass ($\Delta_{mass}$) is inversely proportional to the difference in acceleration ($\Delta_{acceleration}$) and that a variation in $\Delta_{acceleration}$ will result in a variation $\Delta_{mass}$, assuming that the other parameters are kept the same. Because all of the other values in equation 5 are known—torque is known through the engine commands that are causing the acceleration; $\Delta_{acceleration}$ is known from step 130; and the radius is a known quantity that is a characteristic of the particular engine and drivetrain used in vehicle 12—the method is able to solve for $\Delta_{mass}$. Just like the value $\Delta_{acceleration}$ includes an actual acceleration component and an expected acceleration component, the value $\Delta_{mass}$ includes an actual mass component and an expected mass component; the actual mass component is the quantity that exemplary method 100 is attempting to estimate or otherwise determine. The expected mass value can be a predetermined generic mass of the vehicle (e.g., a mass relating to the vehicle's tare weight, curb weight, gross vehicle weight rating, etc.), or it can be a previously estimated mass value, to cite several possibilities. Since the expected mass and $\Delta_{mass}$ are known, the actual mass of the vehicle may be determined by the following equation:

$$\text{Actual Mass} = \text{Expected Mass} + \Delta_{mass} \qquad \text{(equation 6)}$$

Skilled artisans should appreciate that the equations and mathematical representations and relationships presented herein, including equations 1-6, are only meant to illustrate the algorithmic basis of some of the steps involved, as the actual equations used could be more complex and sophisticated than those expressed here. Skilled artisans will recognize that other representations, relationships, equations, factors, etc. may be used or considered since the preceding mathematical expressions may be manipulated and represented in different forms, and that method 100 is not limited to these expressions. For instance, equation 1 can be modified and take the form of equation 1' as shown below:

$$\Delta_{acceleration} = \text{Actual Acceleration} - \text{Expected Acceleration} \qquad \text{(equation 1')}$$

which results in a new and modified equation 6':

$$\text{Actual Mass} = \text{Expected Mass} - \Delta_{mass} \quad \text{(equation 6')}$$

Of course, this is only one example, as other embodiments are also possible.

Step 170 decreases the vehicle mass estimate for situations where the vehicle is being over accelerated, presumably because the vehicle is actually lighter than previously thought. There are a number of different techniques that may be employed by step 170, including ones that decrementally decrease a previous vehicle mass estimate and ones that perform a new vehicle mass estimate. For example, it is possible for step 170 to decrementally decrease the vehicle mass estimate by using a gain factor (e.g., a percentage of previous estimate) according to the following formula:

$$\text{Vehicle Mass Estimate} = \text{Previous Vehicle Mass Estimate} - (\text{Gain Factor} * \text{Previous Vehicle Mass Estimate}) \quad \text{(equation 7)}$$

If during the next cycle the vehicle is still being over accelerated, then step 170 may again decrease or reduce the vehicle mass estimate. The amount that the estimate is decreased per cycle (i.e., the decrement value) may be limited or clamped by a threshold so that vehicle occupants do not experience unexpected and rapid changes in acceleration. Moreover, the decrement threshold can be influenced by different driving modes or settings, where a sport mode allows for larger decrement values and a comfort mode restricts the method to smaller decrement values. This iterative process of decreasing the vehicle mass estimate may continue, for example, until the vehicle is no longer being over accelerated or until some minimum value or threshold is reached (e.g., a minimum threshold that is a percentage, for example 5-20%, of a known mass or weight like tare weight, unladen weight, etc. and is stored in memory 42). If the vehicle mass estimate from step 170 falls below the minimum threshold, then the estimate may be set at the minimum threshold. According to a different embodiment, step 170 may calculate a new vehicle mass estimate by using the previously determined mass differential ($\Delta_{mass}$) and/or the acceleration differential ($\Delta_{acceleration}$), instead of just decreasing the estimate according to a predetermined decrement. A rather simple implementation of this embodiment is illustrated in the following equation:

$$\text{Vehicle Mass Estimate} = \text{Previous Vehicle Mass Estimate} - \Delta_{mass} \quad \text{(equation 8)}$$

In this embodiment, the values for the vehicle mass estimate do not necessarily follow some predetermined pattern, as the method does not subtract a set or predetermined decrement from the estimate each cycle. Other techniques and embodiments may also be utilized by step 170, including closed-loop feedback techniques like proportional-integral-derivative (PID) control that calculate an error value and try to minimize the error value by adjusting different control inputs. Such techniques are self-learning in that the method is able to consistently improve the accuracy of the vehicle mass estimate through a closed-loop feedback system. Skilled artisans will know of other suitable techniques that may be used instead.

At step 180, the method increases the vehicle mass estimate. In this case the vehicle is under accelerating, which means that the actual vehicle mass is probably greater or higher than previously estimated. Step 180 may increase the vehicle mass estimate by using any of the techniques described above in conjunction with step 170, including: using a predetermined increment value, limiting or controlling the increment value, and/or calculating a new vehicle mass estimate that is higher than the previous estimate.

Steps 170 and/or 180 may consider other factors to improve the accuracy or refinement of the vehicle mass estimates. As an example, these steps may evaluate sensor data from driver or passenger monitoring devices, seat sensors, seatbelt sensors, cargo sensors, fuel level sensors, etc. in order to develop a more precise and complete picture as to weight distribution in the vehicle. Thus, method 100 may be used to not only provide an overall vehicle mass estimate, but also to provide an estimate of mass distribution within the vehicle. Other factors besides weight distribution may be considered and taken into account as well.

Continuing with the method, step 190 provides the vehicle mass estimate to one or more vehicle components, devices, modules and/or systems that may in turn use the information. The vehicle mass estimate may be provided to one central unit for access or the estimate may be provided directly to each vehicle device that is requesting it, to cite several examples. In one embodiment, control module 40 provides the vehicle mass estimate to vehicle module 70 which, in turn, uses the improved mass estimate to generate command signals that control some type of automated acceleration, deceleration or other type of event. Module 70 may include any vehicle component, device, module and/or system that utilizes a vehicle mass input, including a safety system (e.g., collision avoidance system, collision mitigation system, etc.), an active suspension system, an active braking system, an adaptive cruise control system (e.g., full speed range adaptive cruise control (FSRACC), etc.), a lane change system (e.g., automated lane change (LCX) system), etc. The present method is not limited to use with any particular module 70 or system.

Method 100 may keep or store the vehicle mass estimate for one ignition cycle (i.e., until the vehicle is turned off and/or on again), it may periodically update the vehicle mass estimate (e.g., multiple updates within a single ignition cycle), or it can update the vehicle mass estimate on a periodic or other basis, to cite a few possibilities.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. In another example, the method is used to estimate the weight of the vehicle as opposed to its mass. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for estimating a vehicle mass, comprising the steps of:
   (a) when a vehicle is under the control of an autonomous acceleration event during which vehicle acceleration is expected to be controlled and consistent, determining an expected acceleration of the vehicle for the autonomous acceleration event wherein the expected acceleration corresponds to vehicle propulsion in a longitudinal direction;
   (b) determining an actual acceleration of the vehicle during the autonomous acceleration event wherein the actual acceleration corresponds to vehicle propulsion in the longitudinal direction;
   (c) comparing the expected acceleration of the vehicle in the longitudinal direction for the autonomous acceleration event to the actual acceleration of the vehicle in the longitudinal direction during the autonomous acceleration event with a control module, and
   (d) using the comparison of the expected acceleration of the vehicle in the longitudinal direction for the autonomous acceleration event to the actual acceleration of the vehicle in the longitudinal direction during the autonomous acceleration event to determine a vehicle mass estimate with the control module.

2. The method of claim 1, wherein step (a) further comprises using engine commands from a module to determine the expected acceleration of the vehicle which is representative of the acceleration that is expected or anticipated of the vehicle during the autonomous acceleration event.

3. The method of claim 2, wherein step (a) further comprises determining that the vehicle is under the control of an adaptive cruise control (ACC) system during a take-off event and then using engine commands issued by the ACC during the take-off event to determine the expected acceleration of the vehicle.

4. The method of claim 1, wherein step (b) further comprises using speed readings from speed sensors to determine the actual acceleration of the vehicle which is representative of the acceleration that is actually or truly experienced by the vehicle.

5. The method of claim 1, wherein step (c) further comprises taking one or more acceleration-influencing factor(s), other than vehicle mass, into account when comparing the expected acceleration to the actual acceleration.

6. The method of claim 5, wherein step (c) further comprises receiving a trailer reading from a trailer sensor in order to determine that the vehicle is pulling a trailer and taking this factor into account when comparing the expected acceleration to the actual acceleration.

7. The method of claim 5, wherein step (c) further comprises receiving an environmental reading from an environmental sensor in order to determine that the vehicle is experiencing certain environmental and/or road conditions and taking this factor into account when comparing the expected acceleration to the actual acceleration.

8. The method of claim 5, wherein step (c) further comprises receiving an incline reading from an incline sensor in order to determine that the vehicle is experiencing an inclined or declined road segment and taking this factor into account when comparing the expected acceleration to the actual acceleration.

9. The method of claim 1, wherein step (c) further comprises subtracting the actual acceleration from the expected acceleration, or vice-versa, in order to determine an acceleration difference ($\Delta_{acceleration}$).

10. The method of claim 9, wherein step (c) further comprises comparing the acceleration difference ($\Delta_{acceleration}$) to a threshold, and keeping the vehicle mass estimate unchanged when the acceleration difference ($\Delta_{acceleration}$) is less than the threshold.

11. The method of claim 1, wherein step (d) further comprises determining if the vehicle is under accelerating or over accelerating, and increasing the vehicle mass estimate if the vehicle is under accelerating and decreasing the vehicle mass estimate if the vehicle is over accelerating.

12. The method of claim 11, wherein step (d) further comprises increasing the vehicle mass estimate by incrementing a previous vehicle mass estimate if the vehicle is under accelerating and decreasing the vehicle mass estimate by decrementing a previous vehicle mass estimate if the vehicle is over accelerating.

13. The method of claim 12, wherein step (d) further comprises incrementing a previous vehicle mass estimate by an increment value if the vehicle is under accelerating and decrementing a previous vehicle mass estimate by a decrement value if the vehicle is over accelerating, and the increment and decrement values are limited by a threshold that is affected by a driving mode of the vehicle.

14. The method of claim 11, wherein step (d) further comprises increasing the vehicle mass estimate by calculating a new vehicle mass estimate that is greater than a previous vehicle mass estimate if the vehicle is under accelerating, and decreasing the vehicle mass estimate by calculating a new vehicle mass estimate that is less than a previous vehicle mass estimate if the vehicle is over accelerating.

15. The method of claim 1, further comprising the step receiving sensor readings from one or more vehicle sensors and using the sensor readings to evaluate the weight distribution within the vehicle.

16. The method of claim 1, further comprising the step providing the vehicle mass estimate to a vehicle module that uses the vehicle mass estimate to generate one or more command signals.

17. The method of claim 16, wherein the vehicle module is part of a vehicle safety system, an active suspension system, an active braking system, an adaptive cruise control (ACC) system, or a lane change system (LCX).

18. A method for estimating a vehicle mass, comprising the steps of:
   (a) determining that the vehicle is under the control of an autonomous acceleration event during which vehicle acceleration is expected to be controlled and consistent,
   (b) evaluating the acceleration of the vehicle corresponding to vehicle propulsion in a longitudinal direction with a control module while the vehicle is under the control of the autonomous acceleration event, wherein the acceleration of the vehicle in the longitudinal direction is evaluated in a closed-loop manner using an expected acceleration of the vehicle in the longitudinal direction corresponding to the autonomous acceleration event,
   (c) using the results of the closed-loop evaluation to generate a vehicle mass estimate with the control module, and
   (d) providing the vehicle mass estimate to a vehicle module so that the vehicle module can generate one or more command signals.

* * * * *